(12) United States Patent
Patotski et al.

(10) Patent No.: US 11,867,799 B2
(45) Date of Patent: Jan. 9, 2024

(54) PULSE DOPPLER RADAR WITH RANGE RESOLUTION

(71) Applicant: Carrier Fire & Security EMEA BV, Diegem (BE)

(72) Inventors: Marat Patotski, Gdansk (PL); Mateusz Mazur, Gdansk (PL)

(73) Assignee: CARRIER FIRE & SECURITY EMEA BV, Diegem (BE)

( * ) Notice: Subject to any disclaimer, the term of this patent is extended or adjusted under 35 U.S.C. 154(b) by 500 days.

(21) Appl. No.: 17/115,515

(22) Filed: Dec. 8, 2020

(65) Prior Publication Data

US 2021/0255311 A1    Aug. 19, 2021

(30) Foreign Application Priority Data

Feb. 14, 2020   (EP) ..................................... 20157419

(51) Int. Cl.
| | |
|---|---|
| *G01S 13/88* | (2006.01) |
| *G01S 13/06* | (2006.01) |
| *G01S 13/62* | (2006.01) |

(52) U.S. Cl.
CPC ............ *G01S 13/886* (2013.01); *G01S 13/06* (2013.01); *G01S 13/62* (2013.01)

(58) Field of Classification Search
CPC .... G01S 17/10; G01S 13/106; G01S 13/0209; G01S 7/4865; G01S 13/30; G01S 13/04; G01S 13/56; G01S 7/28; G01S 7/4808; G01S 7/292; G01S 7/483; G01S 7/526; G01S 13/22; G01S 13/28; G01S 7/484; G01S 13/76; G01S 13/70; G01S 13/66; G01S 13/225; G01S 17/06; G01S 13/227; G01S 7/2923; G01S 13/931; G01S 13/18; G01S 13/726; G01S 13/88
See application file for complete search history.

(56) References Cited

U.S. PATENT DOCUMENTS

| | | | |
|---|---|---|---|
| 6,989,781 B2* | 1/2006 | Steinbuch | H03K 3/33 342/137 |
| 7,081,848 B1 | 7/2006 | Adams | |
| 9,268,008 B1* | 2/2016 | Abileah | G01S 13/534 |
| 2008/0303709 A1 | 12/2008 | Brosche et al. | |
| 2010/0265121 A1* | 10/2010 | Bandhauer | G01S 7/038 342/135 |
| 2016/0097670 A1* | 4/2016 | Hughes | G01S 7/40 342/124 |
| 2018/0052220 A1* | 2/2018 | Fuchs | G01S 13/5244 |

FOREIGN PATENT DOCUMENTS

EP         2159597 A2 *   3/2010  .......... G01S 13/103

OTHER PUBLICATIONS

European Search Report for European Application No. 20157419.1; Report dated Aug. 18, 2020 (pp. 1-12).
Zrnic et al. "Eclipsing Effect Minimization in SS Radars With Variable Pulse Duration Pulse Duration." Serbia and Montenegro, Sep. 28-30, 2005 (pp. 583-586).

* cited by examiner

*Primary Examiner* — Olumide Ajibade Akonai
(74) *Attorney, Agent, or Firm* — CANTOR COLBURN LLP

(57) ABSTRACT

A method of using a radar sensor for a security system to determine a range for a sensed moving object or person, the method including: transmitting, from the radar sensor, a plurality of radar pulses and, when the object or person is present to reflect the radar pulses, receiving a corresponding plurality of pulses.

15 Claims, 2 Drawing Sheets

PULSE DOPPLER RADAR WITH RANGE RESOLUTION

CROSS-REFERENCE TO RELATED APPLICATIONS

This application claims priority to European Patent Application No. 20157419.1, filed Feb. 14, 2020, the contents of which are incorporated by reference herein in their entirety.

BACKGROUND

The present disclosure relates to a method and apparatus using a radar sensor for a security system to determine a range for a sensed object or person.

It is known to use various different sensor types to detect presences by reference to detecting objects and/or movement. For example, sensors are in context of a security system for a building, where it is desired to detect potential intruders. In addition, presence sensor devices for buildings have also been proposed for monitoring the occupancy state of a monitored zone and/or for counting a number of people that are present in a monitored zone. As well as security applications this type of sensing is useful for identifying the presence of people during evacuations or in relation to control of building systems such as heating, ventilation and air conditioning (HVAC) systems.

In the prior art, infrared (IR) sensors are very commonly used. They can detect an object or person having a temperature that is significantly different to the background temperature. Video detection may also be used. Other known sensors may use radar waves or laser-based systems for intruder detection. In relation to sensors for buildings it is known to place sensors for detecting presences within the building or in areas around the building. This may be for the detection of people or animals, or even for the detection and tracking of vehicles.

Radar sensors may have some advantages over IR sensors such as increased resolution of detected images and an ability to detect both the presence and also the position of an intruder relative to the sensor within the detection zone of the sensor. It will be appreciated that this then allows improvements in relation to detection of multiple people and discrimination between people or other presences (e.g. animals) in circumstances where there are two separate presences within a monitored zone. This is not always possible with IR sensor systems. Another advantage of a radar sensor is that radio waves are able to penetrate through a wide range of materials, including some materials used for internal and external walls of buildings. This means that furniture in a room or even walls may not prevent a radar sensor from detecting intruders in a monitored zone that is on the other side of a wall or is in some other way obstructed in terms of visible line-of-sight.

Radar sensors for use in building security are typically continuous wave (CW) radar sensors. These kinds of sensors measure changes in frequency of reflected radar waves (the Doppler Effect) to detect movement. These sensors have limited ranges and are capable of only detecting when an object or person is moving within that range, but not the direction of movement or the particular position of the object or person within the range. Therefore, known radar sensors still have some limitations and improved radar based sensor devices are desirable.

SUMMARY

Viewed from a first aspect, the invention provides a method of using a radar sensor for a security system to determine a range for a sensed moving object or person, the method comprising: transmitting, from the radar sensor, a plurality of radar pulses and, when the moving object or person is present to reflect the radar pulses, receiving a corresponding plurality of pulses, the transmitting and receiving comprising: transmitting a first radar pulse having a first defined pulse duration; receiving a first reflected radar pulse, wherein the first reflected radar pulse is at least a portion of the first radar pulse that has reflected off of the moving object or person; determining, at the radar sensor, whether there is a first pulse overlap between the first radar pulse and the first reflected radar pulse; selecting a second defined pulse duration for a second radar pulse based on the determination of the first pulse overlap; transmitting the second radar pulse having the second pulse duration; and receiving a second reflected radar pulse, wherein the second reflected radar pulse is at least a portion of the second radar pulse that has reflected off of the moving object or person; determining, at the radar sensor, whether there is a second pulse overlap between the second radar pulse and the second reflected radar pulse; and determining a range in which the object or person is located based on the determinations of the first pulse overlap and the second pulse overlap.

Some advantages of the invention are that this method allows for improved resolution and definition of the distance from a radar sensor to an object or person and that a direction of movement of an object or person may be determined by measuring position over time. Additionally, the method allows an annular detection zone to be defined.

As discussed above, the use of radar sensing in general has many advantages over IR or visual sensing, including the ability for radar sensors to detect objects and movement through walls and smoke.

Viewed from a second aspect, the invention provides a security system comprising a radar sensor for determining a range of a sensed moving object or person, the radar sensor comprising: a transmitting antenna, configured to transmit a plurality of radar pulses; a receiving antenna, configured to receive a corresponding plurality of pulses; an oscillator; a mixer; a pulse modulator; and a controller; wherein the radar sensor is configured to transmit a plurality of radar pulses and, when the object or person is present to reflect the radar pulses, receive a corresponding plurality of pulses, the transmitting and receiving comprising: transmitting a first radar pulse having a first defined pulse duration; receiving a first reflected radar pulse, wherein the first reflected radar pulse is at least a portion of the first radar pulse that has reflected off of the moving object or person; determining whether there is a first pulse overlap between the first radar pulse and the first reflected radar pulse; selecting a second defined pulse duration for a second radar pulse based on the determination of the first pulse overlap; transmitting the second radar pulse having the second pulse duration; receiving a second reflected radar pulse, wherein the second reflected radar pulse is at least a portion of the second radar pulse that has reflected off of the moving object or person; and determining whether there is a second pulse overlap between the second radar pulse and the second reflected radar pulse; and wherein the radar sensor is configured to determine a range in which the moving object or person is located based on the determinations of the first pulse overlap and the second pulse overlap.

Viewed from a third aspect, the invention provides a computer program product containing instructions that, when executed within a radar sensor for determining a range of a sensed object or person, will configure the radar sensor to operate in accordance with the method of the first aspect.

The radar sensor may select the first and second defined pulse durations from a list of predefined pulse durations. The list may have two, five, ten, or any number of entries. Each entry contains one predefined pulse duration which corresponds to a particular range. The amount of entries on the list may be dependent on qualities such as the size of a space that the sensor is monitoring and the desired resolution of the sensor.

The resolution of the sensor may define the distance between ranges corresponding to pulse durations on the list. The distance between chosen ranges may be equal (e.g. a sequence of ranges on a list may be 2 m, 4 m, 6 m, 8 m, etc.) or unequal (e.g. a sequence of ranges on a list may be 2 m, 6 m, 8 m, 9 m, 11 m, etc.). That is, ranges on the list may be equally spaced or unequally spaced. Adjacent entries on the list may be spaced by 0.5 m, 1 m, 2 m, 5 m, or by any other suitable spacing.

Each of the plurality of radar pulses may have a defined pulse duration selected from a list of predetermined pulse durations. The plurality of radar pulses may comprise a subset of radar pulses, and the method may further comprise transmitting the subset of radar pulses in a predetermined sequence of predetermined pulse durations.

Each of the plurality of radar pulses has a unique defined pulse duration. That is, no two radar pulses in the plurality of radar pulses may have the same defined pulse duration.

As mentioned above, the radar sensor selects the second defined pulse duration based on the determination of the first pulse overlap. That is, the radar sensor may select the second defined pulse duration depending on the presence of the first pulse overlap. The second defined pulse duration may be chosen to be longer than the first defined pulse duration if the radar sensor determines that there is no first pulse overlap. The second defined pulse duration may be chosen to be shorter that the first defined pulse duration if the radar sensor determines that a first pulse overlap is present. The second defined pulse duration may not be the selected to be the same duration as the first defined pulse duration.

The second defined pulse duration may not be the same as a previously selected defined pulse duration.

The radar sensor may transmit radar pulses toward a defined direction or sector or omni-directionally.

The radar sensor may have a maximum range, corresponding to a maximum pulse duration. The maximum range may be dependent on the space in which the radar sensor is placed. For indoor residential applications the maximum range may be about 8-16 meters. For indoor open office spaces or factory floors, the maximum range may be about 40 m. For outdoor zones, the maximum range may be about 100 meters or more.

The first defined pulse duration may be the longest pulse duration on the list of predefined pulse durations. Alternatively, the first defined pulse duration may be the shortest defined pulse duration available. In the latter case, if detection is observed (i.e. a pulse overlap is present) the radar sensor is able to determine that the moving object or person is within the shortest range available to the radar sensor and the radar sensor may not be able to select a second pulse duration The plurality of radar pulses transmitted by the radar sensor may be a first set of radar pulses. The method may further comprise transmitting a second set of radar pulses. The second set may be transmitted in accordance with the method for which the first set of radar pulses was transmitted. The radar sensor may transmit more than two sets of radar pulses. The radar sensor may be able to determine the direction of movement of an object or person by determining the range of the object or person over multiple sets of radar pulses within a time period. The "directionality" here may simply refer to whether the object or person is moving towards or away from the radar sensor.

The radar sensor may transmit sets of radar pulses continuously. That is, the time gap between sets of pulses may be similar to the time gap between radar pulses within a set of radar pulses. Alternatively, the radar sensor may transmit sets of pulses intermittently or within particular time periods.

The radar sensor may transmit a set of sequential radar pulses wherein the radar pulses within the set have a predefined sequence. The radar sensor may store multiple sequences of radar pulses that may be transmitted in particular circumstances. For example using the same set of sequential radar pulses several times may allow the radar sensor to determine the change of an object or person's position over time.

A pulse repetition frequency may be defined as how often the radar sensor transmits a set of radar pulses. The radar sensor may change the pulse repetition frequency of which it transmits sets of radar pulses depending on application, scenario or surroundings, expected maximum velocity of a moving object or person, range resolution or certification requirements, or any combination of these factors. If the radar sensor is set up to detect a moving person, the radar sensor may transmit sets of radar pulses with a pulse repetition frequency of about 0.5 s. If, however, the radar sensor is set up to detect faster moving objects (i.e. a radar sensor dedicated for drones, vehicles, etc.), the radar sensor may transmit sets radar pulses more frequently (i.e. increase the pulse repetition frequency). If the object or a person is expected to move slower, for example a person is forced by their surroundings such that they are only able to crawl, the radar sensor may transmit sets radar pulses less frequently (i.e. reduce the pulse repetition frequency).

The expected maximum velocity of moving objects or people may depend on the implementation of the radar sensor. For example, if the radar sensor is installed in a room for the detection of an intruder, then the expected maximum velocity will be set appropriately for the situation.

The frequency of transmission may also depend on the resolution of the radar sensor. A higher resolution may lead to a greater frequency in transmission of radar pulses.

Once the range in which the object or person is located has been determined, the radar sensor may lock on to the object or person and track the object or person. The tracking may last for a defined period of time or for the duration that the object or person is within range of the radar sensor.

The first and second pulses, or indeed any of the radar pulses, may instead be a burst of radar pulses of the same defined pulse duration. That is, the first radar pulse may be a first burst of radar pulses, each having the same first defined pulse duration. Equally, the second radar pulse may be a second burst of radar pulses, each having the same second defined pulse duration. In response to a burst of radar pulses, a burst of reflected radar pulses may be received by the receiving antenna. The radar sensor may be configured to take an average of measured Doppler shift frequencies, if the reflected radar pulses have been reflected from a moving object or person, to determine whether a moving object or person has been detected.

Using bursts of radar pulses may have an advantage in situations in which one reflected radar pulse is not strong enough or is unclear to provide a clear indication of whether a moving object or person has been detected.

An object detectable by the radar sensor may be a drone or other unmanned vehicle, where the drone may be piloted by a person or may be autonomous. Alternatively, the object may be a car or other road vehicle.

The security system may comprise multiple radar sensors to cover one or more detection zones. The multiple sensors may be calibrated simultaneously or separately. The multiple sensors may be configured to form a mesh network. In a mesh network, the sensors may be configured to cover different parts of a defined detection zone.

The radar sensor may be installed indoors, such as in a room of a living space or in a warehouse, or in an outdoor space, such as a garden or driveway.

The radar sensor may comprise processing circuitry, a memory unit, an oscillator, a mixer, a pulse modulator, a transmitting antenna, a communications transmitter, a receiving antenna, and a communications receiver. The radar sensor may also comprise a low pass filter, a power splitter or coupler, a detector, and an analogue to digital converter (ADC). The transmitting antenna may be configured to transmit radio signals in to a space that includes the detection zone for sensing moving objects and persons.

The radar pulses to be transmitted by the transmitting antenna may be set by the controller. That is, a list of predefined pulse durations may be stored in the memory unit of the radar sensor and the controller may access the list and select a predefined pulse duration from the list. The memory unit may be part of the controller. The controller may then send a signal to the pulse modulator, the signal carrying information to instruct the pulse modulator to modulate a radar pulse generated at the oscillator such that the radar pulse has the selected predefined pulse duration.

The communications transmitter may be configured to transmit signals to other sensors and the communications receiver may be configured to receive transmissions from other sensors. The communications transmitter may be any kind of antenna with a generator or oscillator producing an appropriate signal. The radar sensor may comprise multiple communications transmitters for separate transmission of communications between devices and for positional sensing. The radio signals may be transmitted at a frequency of 900 MHz, 2.4 GHz, 5.8 GHz, 10.5 GHz, 24 GHz, 60 GHz bands, or any other frequency according to standards-based frequency ranges.

The controller may be configured to send signals to the pulse modulator and to receive signals from the detector or from the ADC. The oscillator may be configured to generate pulses with a pulse repetition frequency and a predefined duration as defined by the pulse modulator. The pulse modulator may be configured to define the pulse repetition frequency and the predefined duration of signals in accordance with instructions received from the controller. These instructions relate to the generation of radar pulses in accordance with the method of the first aspect.

The oscillator may be configured to generate pulse modulated signals and send these signals to the power splitter. A radar pulse in this example may have a frequency $f_T$. The power splitter may be configured to send a portion of the signal to the transmitting antenna and the remaining portion to the mixer. Both portions of the signal may have a frequency $f_T$.

The transmitting antenna transmits the radar pulse. The receiving antenna may receive a reflected radar pulse. A radar pulse reflected from a moving object or person may have a Doppler shifted frequency. Therefore, the reflected radar pulse may have a frequency $f_R = f_T \pm f_D$, where $f_D$ is the Doppler shifted frequency. The receiving antenna may be configured to send the received radar pulse to the mixer.

The mixer may be configured to mix the frequencies of the original signal and the reflected signal and output the Doppler shifted frequency $f_D = |f_R - f_T|$. This signal may be passed through the low pass filter and then to the detector.

The detector may be configured to detect the presence of a Doppler shifted frequency $f_D$ and to communicate whether such a presence is present to the controller. The controller may also be connected to an output. The output may be an alarm or other circuitry configured to process signals from the controller.

The same antenna may be used as a transmitting antenna and receiving antenna or these may be separate antennas. The receiving antenna may comprise multiple antennas oriented in different directions to collect the reflected signals. The receiving antenna may also be configured to collect signals from a control device or from other sensors. Any or all of the transmitting antennas and receiving antennas that may be present in the radar sensor may be directional antennas.

The list of predefined pulse durations may be updated via an external download or by a software update to the radar sensor.

DRAWING DESCRIPTION

Certain embodiments of the disclosure will now be described by way of example only and with reference to the accompanying drawings in which.

DETAILED DESCRIPTION

Figure 1:
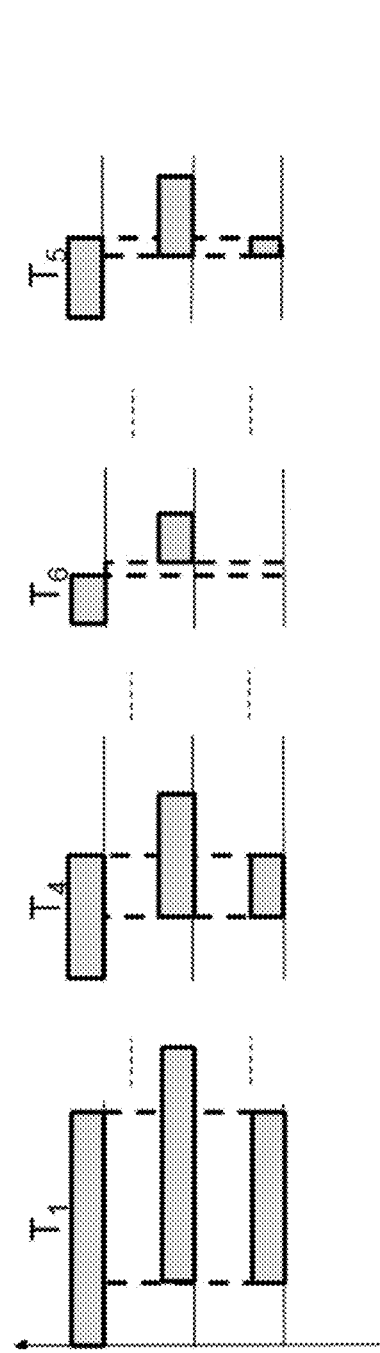
FIG. 1 shows a chart illustrating a series of pulses transmitted by the radar sensor over a period of time.

As discussed above, conventional radar sensors used in building security systems typically use continuous wave radar to detect movement within range of the sensor. Such sensors are not able to distinguish the direction of movement of an object or person moving within its range, nor are they able to determine the position of an object or person moving within its range.

A method for operating a radar sensor comprises transmitting a plurality of radar pulses from the sensor to determine the position of a moving object or person within a range of the radar sensor and to determine the direction of movement of the object or person.

The radar sensor transmits a first radar pulse having a first pulse duration. The pulse duration is a predetermined duration selected from a list of predetermined pulse durations. Each predetermined pulse duration corresponds to a particular distance within range of the sensor. That is, the pulse duration for a particular range is the length of time it would take for an electromagnetic wave to travel over a particular range and back from an object that reflects the electromagnetic wave. This may, of course be generalized as $t = 2r/c$, where t is the pulse duration, r is a distance from the sensor, and c is the speed of light. Therefore, the list may comprise any number of entries each corresponding to a particular range. There is also no requirement for the pulse durations on this list to be equally spaced.

The list may contain any number of entries, each entry being a unique pulse duration corresponding to a particular distance. The list may comprise as few as two entries, but may comprise five, ten, or twenty entries, or more. The amount of entries on the list is dependent on qualities such as the size of a space that the sensor is monitoring and the desired resolution of the sensor.

The radar sensor has a resolution which determines the time between each entry in the list, and therefore, the corresponding distances that may be measured by the sensor. For example, if the resolution of the sensor was 2 m, the sensor would be able measure distances in 2 m increments. More specifically, the radar sensor is able to detect the presence of a moving object or person within the range corresponding to the pulse duration of a radar pulse. So, a radar pulse having a pulse duration corresponding to 6 m is able to detect a moving object or person anywhere within a 6 m range of the radar sensor. An example of a list having five entries and the sensor having maximum range of 10 m may be as follows:

| Pulse duration [ns] | Corresponding (Maximum) Range [m] |
|---|---|
| 66.67 | 10 |
| 53.33 | 8 |
| 40.00 | 6 |
| 26.67 | 4 |
| 13.33 | 2 |

This example is not exhaustive. Sensors may be constructed having resolutions of 0.5 m, 1 m, 2 m, 5 m, or any other suitable resolution. The resolution of the sensor may be changed through a software update. The resolution of the sensor may depend on the size of the space that the sensor is monitoring, whether that is a room inside a building or in a parking lot or in a garden.

At some time after the first radar pulse is transmitted, the sensor begins to receive a first reflected radar pulse. This first reflected radar pulse is the reflection of the first radar pulse off of an object or person. The reflection of the radar pulse may not be perfect, so the reflected radar pulse may be a small portion of the first radar pulse.

After the radar sensor has finished receiving the first reflected radar pulse, the sensor transmits a second radar pulse. The second radar pulse has a second pulse duration. The second pulse duration is, like the first pulse duration, picked from the list of predetermined pulse durations.

As with the first radar pulse, at some time after the second radar pulse is transmitted the sensor begins to receive a second reflected radar pulse. This second reflected radar pulse is the reflection of the second radar pulse that has been reflected off of the same object or person as the first reflected radar pulse.

The radar sensor determines whether a moving person or object has been detected by checking for a pulse overlap between a transmitted radar pulse and a reflected radar pulse. Therefore, the sensor determines whether the object or person is in a first range corresponding to a first pulse duration. This is done by checking for a pulse overlap.

A pulse overlap occurs when a reflected radar pulse begins to be received by the sensor before the sensor finishes transmitting a radar pulse. In the case that a pulse overlap is detected by the radar sensor, the radar sensor determines that the object or person is within the range corresponding to the pulse duration.

If there is no pulse overlap detected by the sensor, then the sensor is able to determine that the moving object or moving person is not inside of the range corresponding to the pulse duration.

By transmitting a plurality of pulses having different pulse durations, the radar sensor is able to determine the boundaries of the region in which the object or person is present and hence is able to perform a range finding process based on the presence or absence of overlap for the different pulse durations. Assuming that the timing between pulses is of the same order as the pulse durations then in the cases of interest (e.g. persons moving in or around a building) the object or person can be assumed to be moving slowly enough that their range, within a resolution in metres, will not change during the sensing of the pulses. That is to say, the pulses are short enough in duration that persons (or other similar objects) cannot move quickly enough to change range even when a number of pulses are used, since the pulses only require a very short time period. The radar sensor is of course also able to detect whether the object or person has moved between defined ranges, by means of pulses or sequences of pulses that occur at different times, with the difference being of a duration long enough for movement at reasonable speeds, e.g. seconds or milliseconds rather than nanoseconds. It can hence also be arranged for measuring the direction of movement of the object or person.

With the above principle for range finding in mind, the method further comprises the radar sensor determining whether a first pulse overlap is present between the first radar pulse and the first reflected radar pulse. If a first pulse overlap is present, then the radar sensor selects a second defined pulse duration that is shorter than the first defined pulse duration. If a first pulse overlap is not detected by the radar sensor, then the radar sensor selects a second defined pulse duration that is longer than the first defined pulse duration.

After transmitting a plurality of radar pulses, the radar sensor can determine the range of an object or person from which its transmitted radar pulses are being reflected. This can be identified via the range associated with the shortest pulse duration that displays an overlap. The precise number of radar pulses needed to make these determinations is not fixed. The radar sensor may be able to make these determinations after two radar pulses or five or ten, or as many as it takes to narrow down the range in which the object person is located. This may also be dependent on how the radar sensor selects its first defined pulse duration and subsequent pulse durations.

In this way, the radar sensor is able to determine the position and direction of movement of an object or person moving within its maximum range. One particular example of the method is outlined below.

In this example, the radar sensor has access to a list of predefined pulse durations as shown in the following table:

| Pulse duration [ns] | Corresponding Range [m] |
|---|---|
| $T_1 = 106.67$ | $R_1 = 16$ |
| $T_2 = 93.33$ | $R_2 = 14$ |
| $T_3 = 80.00$ | $R_3 = 12$ |
| $T_4 = 66.67$ | $R_4 = 10$ |
| $T_5 = 53.33$ | $R_5 = 8$ |
| $T_6 = 40.00$ | $R_6 = 6$ |
| $T_7 = 13.33$ | $R_7 = 2$ |

For this example, the pulse durations for each entry on the list have been labelled with $T_1, T_2, \ldots, T_7$ and their corresponding ranges have been labelled $R_1, R_2, \ldots, R_7$ for ease of reference.

FIG. 1 shows a chart illustrating a series of pulses transmitted by the radar sensor over a period of time, where time is on the x-axis. The radar sensor begins by transmitting a first radar pulse having a first pulse duration $T_1$ to locate an object or person at an unknown distance away from the radar sensor. The radar sensor begins to receive a first reflected radar pulse before it has completed transmission of the first radar pulse. A pulse overlap is detected by the radar sensor. The radar sensor thus determines that the object or person is within range $R_1$.

In accordance with the method, the radar sensor selects a second pulse duration that is shorter than the first pulse duration. In this case, the radar sensor selects a second pulse duration T4. As before, the radar sensor transmits a second radar pulse and, at some time later, begins to receive a second reflected radar pulse. A pulse overlap is detected by the radar sensor. The radar sensor thus determines that the object or person is within range R4.

In accordance with the method, the radar sensor selects a third pulse duration that is shorter than the second pulse duration. In this case, the radar sensor selects a third pulse duration T6. As before, the radar sensor transmits a third radar pulse and, at some time later, begins to receive a third reflected radar pulse. This time, however, the sensor does not detect a pulse overlap. The radar sensor thus determines that the object or person detected previously in range R4 is outside range R6.

In accordance with the method, the radar sensor selects a fourth pulse duration that is longer than the second pulse duration. As the radar sensor has previously selected T4, the radar sensor selects T5 to be the fourth pulse duration. The radar sensor transmits a fourth radar pulse and, at some time later, begins to receive a fourth reflected radar pulse. A pulse overlap is detected by the radar sensor. The radar sensor thus determines that the object or person is within range $R_5$. As the radar sensor had previously determined that the object or person is outside range $R_6$, the radar sensor determines that the object or person is located between range $R_5$ and range $R_6$.

Figure 2:
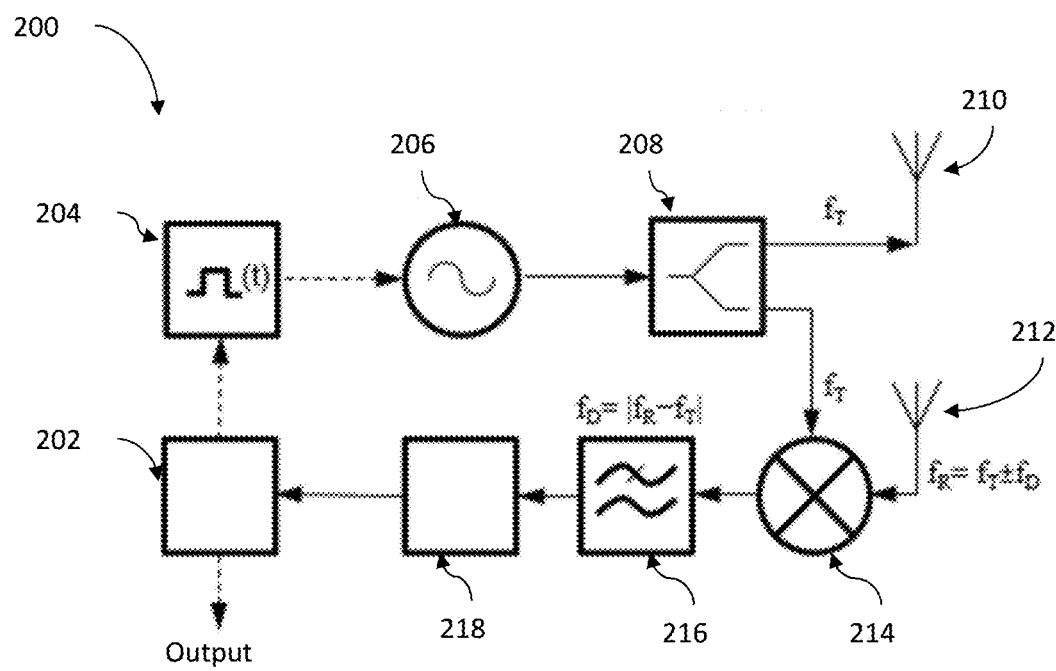
FIG. 2 shows a schematic view of an example arrangement of a radar sensor.

FIG. 2 shows a schematic view of an example arrangement of a radar sensor 200. The radar sensor comprises a controller 202, a pulse modulator 204, an oscillator 206, a power splitter 208, a transmitting antenna 210, a receiving antenna 212, a mixer 214, a low pass filter 216, and a detector 218.

The controller may comprise processing circuitry and a memory unit, wherein a list of predetermined pulse durations may be stored in the memory unit. The controller 202 is configured to send signals to the pulse modulator 204 and to receive signals from the detector 218. The oscillator 206 generates pulses with a pulse repetition frequency and a duration as defined by pulse modulator 204 . . . . The pulse modulator 204 is also configured to modulate signals in accordance with instructions received from the controller 202. These instructions relate to the generation of radar pulses in accordance with the method described above.

The oscillator 206 is configured to generate pulse modulated signals and send these signals to the power splitter 208. A radar pulse in this example has a frequency fT. The power splitter 208 is configured to send a portion of the signal to the transmitting antenna 210 and the remaining portion to the mixer 214. Both portions of the signal have a frequency fT.

The transmitting antenna 210 is configured to transmit the radar pulse. The receiving antenna 212 is configured to receive a reflected radar pulse. A radar pulse reflected from a moving object or person has a Doppler shifted frequency. Therefore, the reflected radar pulse has a frequency fR=fT±fD, where fD is the Doppler shifted frequency. The receiving antenna 212 is configured to send the received radar pulse to the mixer 214.

The mixer 214 is configured to mix the frequencies of the original signal and the reflected signal and output the Doppler shifted frequency fD=|fR−fT|. This signal is passed through the low pass filter 216 and then to the detector 218.

The detector 218 is configured to detect the presence of a Doppler shifted frequency fD and to communicate whether such a presence is present to the controller 202. The controller 202 is also connected to an output. The output may be an alarm or other circuitry configured to process signals from the controller 202.

What is claimed is:

1. A method of using a radar sensor for a security system to determine a range for a sensed moving object or person, the method comprising:
   transmitting, from the radar sensor, a plurality of radar pulses and, when the object or person is present to reflect the radar pulses, receiving a corresponding plurality of pulses, the transmitting and receiving comprising:
   transmitting a first radar pulse having a first defined pulse duration;
   receiving a first reflected radar pulse, wherein the first reflected radar pulse is at least a portion of the first radar pulse that has reflected off of the object or person;
   determining, at the radar sensor, whether there is a first pulse overlap between the first radar pulse and the first reflected radar pulse;
   selecting a second defined pulse duration for a second radar pulse based on the determination of the first pulse overlap;
   transmitting the second radar pulse having the second pulse duration;
   receiving a second reflected radar pulse, wherein the second reflected radar pulse is at least a portion of the second radar pulse that has reflected off of the object or person; and
   determining, at the radar sensor, whether there is a second pulse overlap between the second radar pulse and the second reflected radar pulse; and
   determining a range in which the object or person is located based on the determinations of the first pulse overlap and the second pulse overlap.

2. The method of claim 1, wherein the first and second defined pulse durations are selected from a list of predetermined pulse durations.

3. The method of claim 2, wherein time intervals between entries on the list are equal.

4. The method of claim 2, wherein time intervals between entries on the list are not equal.

5. The method of claim 1, wherein, if the radar sensor determines that there is a first pulse overlap, then the second defined pulse duration is selected to be shorter than the first defined duration.

6. The method of claim 1, wherein, if the radar sensor determines that there is no first pulse overlap, then the second defined pulse duration is selected to be longer than the first defined duration.

7. The method of claim 1, wherein each of the plurality of radar pulses has a defined pulse duration selected from a list of predetermined pulse durations.

8. The method of claim 7, wherein the plurality of radar pulses comprises a subset of radar pulses, wherein the method further comprises transmitting the subset of radar pulses in a predetermined sequence of predetermined pulse durations.

9. The method of claim 7, wherein each of the plurality of radar pulses has a unique defined pulse duration.

10. The method of claim 1, wherein the plurality of radar pulses is a first plurality of radar pulses and the method further comprises transmitting a second plurality of radar pulses.

11. The method of claim 5, wherein the method further comprises:
    transmitting, from the radar sensor, a second plurality of radar pulses and, when the object or person is present to reflect the radar pulses, receiving a second corresponding plurality of pulses, the transmitting and receiving comprising:
    transmitting a third radar pulse having a third defined pulse duration;
    receiving a third reflected radar pulse, wherein the third reflected radar pulse is at least a portion of the third radar pulse that has reflected off of the object or person;
    determining, at the radar sensor, whether there is a third pulse overlap between the third radar pulse and the third reflected radar pulse;
    selecting a fourth defined pulse duration for a fourth radar pulse based on the determination of the third pulse overlap;
    transmitting the fourth radar pulse having the fourth pulse duration;
    receiving a fourth reflected radar pulse, wherein the fourth reflected radar pulse is at least a portion of the fourth radar pulse that has reflected off of the object or person; and
    determining, at the radar sensor, whether there is a fourth pulse overlap between the fourth radar pulse and the fourth reflected radar pulse; and
    determining a range in which the object or person is located based on the determinations of the third pulse overlap and the fourth pulse overlap.

12. The method of claim 6, wherein the method further comprises determining a direction of movement of the object or person.

13. A security system comprising a radar sensor for determining a range of a sensed moving object or person, the radar sensor comprising:

a transmitting antenna, configured to transmit a plurality of radar pulses;
a receiving antenna, configured to receive a corresponding plurality of pulses;
an oscillator;
a mixer;
a pulse modulator; and
a controller;
wherein the radar sensor is configured to transmit a plurality of radar pulses and, when the object or person is present to reflect the radar pulses, receive a corresponding plurality of pulses, the transmitting and receiving comprising:
transmitting a first radar pulse having a first defined pulse duration;
receiving a first reflected radar pulse, wherein the first reflected radar pulse is at least a portion of the first radar pulse that has reflected off of the object or person;
determining whether there is a first pulse overlap between the first radar pulse and the first reflected radar pulse;
selecting a second defined pulse duration for a second radar pulse based on the determination of the first pulse overlap;
transmitting the second radar pulse having the second pulse duration;
receiving a second reflected radar pulse, wherein the second reflected radar pulse is at least a portion of the second radar pulse that has reflected off of the object or person; and
determining whether there is a second pulse overlap between the second radar pulse and the second reflected radar pulse; and
wherein the radar sensor is configured to determine a range in which the object or person is located based on the determinations of the first pulse overlap and the second pulse overlap.

14. A radar sensor, wherein the radar sensor is configured to operate in accordance with the method of claim 1.

15. A computer program product including a non-transitory computer readable medium containing instructions that, when executed within a radar sensor for determining a range of a sensed object or person, will configure the radar sensor to operate in accordance with the method of claim 1.

* * * * *